United States Patent Office 3,325,370  
Patented June 13, 1967

3,325,370  
AQUEOUS X-RAY CONTRAST COMPOSITION CONTAINING A SODIUM SALT OF AN IODINATED ORGANIC ACID AND MAGNESIUM IONS  
Hugo Holtermann, Hovik, Baerum, and Sigbjorn Salvesen, Eiksmarka, Oslo, Norway, assignors to Nyegaard & Co. A/S, Oslo, Norway, a Norwegian body corporate  
No Drawing. Filed Mar. 16, 1964, Ser. No. 352,719  
Claims priority, application Great Britain, Mar. 25, 1963, 11,742/63  
19 Claims. (Cl. 167—95)

This invention relates to improvements in injectable media such as X-ray contrast media containing sodium salts.

The present application is a continuation-in-part of our application Ser. No. 300,167, filed Aug. 6, 1963, and now abandoned.

We have found that when preparations containing sodium ions are injected into the vascular system a number of unwanted physiological side-effects may occur, especially at high concentration and rate of injection. It has been observed that, on injection of certain X-ray contrast media containing sodium ions into the peripheral arteries, considerable pain may be experienced by the patient; and in experiments with rabbits, we have now found that sodium salts of certain iodinated acids are appreciably more toxic under some circumstances than the corresponding N-methyl glucamine salts, while the N-methyl glucamine salts are more toxic under other circumstances and furthermore give very viscous solutions at high concentration which makes high rates of injection difficult in many cases. Since in certain types of radiology, notably angiocardiography, it is desirable to inject X-ray contrast agents at very high concentrations and speeds in order to produce as much contrast as possible in the resulting images, it is of importance to reduce the unwanted physiological side effects due to sodium ions at high concentrations.

It should be noted, however, that sodium ions are among the least toxic of cations and sodium salts are very commonly chosen for their physiological compatibility. Nevertheless, in a number of applications, as indicated above, such side effects can be troublesome and it is an object of this invention to provide injectable preparations containing sodium ions in which unwanted side effects are reduced.

We have now found that the physiological compatibility, (e.g. the acute toxicity as determined by injection at relatively high speeds into the ear veins of rabbits) of the sodium ions in concentrated solutions of various sodium salts can be substantially improved by including comparatively minor quantities of calcium and/or magnesium ions in the solution. The pain induced by administration as well as damage caused to the site of injection also appears to be reduced. The effect is believed to be connected with the ion balance in the body fluids, which balance is greatly disturbed by the injection of large quantities of sodium ions without compensating quantities of calcium or magnesium ions.

Thus, for example, in our experiments the $LD_{50}$ of a 75% aqueous solution of sodium metrizoate (2655 mg. $Na^+$ per 100 ml.) was determined by injection at a rate of 12 ml./min. into the ear vein of rabbits and the $LD_{50}$ of the same solution containing varying quantities of calcium and magnesium ions was determined by the same method. Some representative results are shown in the following table. It should be noted that whereas the simple solution of sodium metrizoate caused death rapidly with hemorrhagic symptoms, the solutions containing Ca and Mg ions normally caused death in the course of about 2 hours by disturbance of the central nervous system.

TABLE I  
[Sodium metrizoate 75% (2,655 mg. $Na^+$/100 ml.) added ions (as chloride)]

| Ca++ | | Mg++ | | $LD_{50}$, g./kg. rabbit |
|---|---|---|---|---|
| Mg./100 ml. medium | Cam/Cap (see later) | Mg./100 ml. medium | Mgm/Mgp (see later) | |
| 0 | 0 | 0 | 0 | 9.9±0.85 |
| 108.8 | 2.3 | 47.2 | 2.3 | 16.2±1.0 |
| 217.6 | 4.6 | 94.4 | 4.6 | 17.2±1.3 |

According to the present invention therefore we provide X-ray contrast media comprising at least one sodium salt of an iodinated organic acid as contrast agent and containing ions selected from the group consisting of calcium and magnesium ions whereby the physiological compatibility of the preparations is improved.

The iodinated organic acids include, for example, sulphonic acids, carboxylic acids, etc. Polyiodocarboxylic acids are the preferred iodinated acids.

The calcium and/or magnesium ions may be supplied by adding a calcium and/or magnesium salt of the active principal or by adding or forming another physiologically and chemically compatible water soluble calcium and/or magnesium salt.

The invention is of especial interest in the field of vascular and urographic radiology, where very high concentrations of sodium ions (originating from sodium salts of iodinated organic acids) are common. Sodium ions are especially useful in this context on account of their small atomic weight (to maintain a high specific iodine concentration), their general lack of toxicity as compared with other metal cations and the generally high water-solubility of their salts as well as the generally low viscosity of their aqueous solutions. The invention is thus particularly applicable to the radiological compositions such as those used for angiocardiography, and the sodium salt is therefore advantageously a sodium salt of an iodinated organic acid, for example a polyiodocarboxylic acid. Examples of sodium salts of polyiodocarboxylic acids useful as contrast agents are described in British specifications, 721,264, 748,319, 764,104, 791,997 and 748,786 and in our British applications Nos. 41782/60 and 7445/62. The former mentioned application is now British patent specification 973,888.

The sodium salt used as contrast agent is preferably one which is soluble in water to give a sodium ion concentration of at least 8 mg. per millilitre since addition of Ca and/or Mg ions is most valuable at high sodium ion concentrations. Particular examples of such contrast agents are for example, sodium metrizoate (sodium 5-N methylacetamido-3-acetamido - 2,4,6 - triiodobenzoate), sodium diatrizoate (sodium 3,5-diacetamido-2,4,6-triiodobenzoate), sodium iothalamate (sodium 3-acetamido-5-methylcarbamyl-2,4,6-triiodobenzoate), sodium-3,5 - dipropionylamido - 2,4,6 - triiodobenzoate, sodium N,N'-di (hydroxyethyl)-3,5-diacetylamido-2,4,6 - triiodobenzoate, sodium 3-acetamido-2,4,6-triiodobenzoate, sodium 3-acetamido-5-propionamido-2,4,6-triiodobenzoate, etc. Sodium metrizoate and sodium iothalamate are particularly important in this connection since they can form solutions at room temperature of over 80% by weight, and are commonly used at this concentration level. It will be appreciated that the active ingredient must be one which remains soluble in the composition at least for a practicable period of time at the chosen concentration of calcium and/or magnesium ions.

The quantities of calcium or magnesium ions in the preparations are preferably small compared with the quantity of sodium ions. The ratio of magnesium or calcium ions to sodium ions is preferably at least .00025, advantageously at least .0005, the preferred ratio of magnesium ions to sodium ions being 0.005 to 0.05, while the preferred ratio of calcium ions to sodium ions is 0.015 to 0.1.

Calcium ions alone are very effective, but it may be preferred to use calcium ions and magnesium ions simultaneously, because this is more nearly physiological and because when the true solubility of the calcium ions in a medium is lower than its optimal concentration, magnesium can be used simultaneously and thereby adds to the effect without exceeding the limiting solubility or without increasing the degree of supersaturation of the medium with respect to calcium. Although the anesthetic effects (pareses) of magnesium ions in excess with respect to calcium ions will generally make it preferable to add calcium when magnesium is present, the anesthetic effect of magnesium ions in excess or in the absence of calcium ions might be taken advantage of in certain applications such as peripheral arteriography. Calcium ions may have to be used alone or in excess in cases where magnesium ions are insufficiently soluble to give any noticeable effect, as in 50% sodium diatrizoate.

In our experiments with 45% and 75% sodium metrizoate, using calcium and magnesium ions in their physiological ratio, i.e. 2.3:1, the optimal ratio of $Ca^{++}$ to $Na^+$ is approximately 0.025 to 0.07 (and for the magnesium present $Mg^{++}/Na^+$ is approximately 0.011 to 0.028). For 45% metrizoate, the optimal ratio $Ca^{++}/Na^+$ is at the lower end of this range for example 0.025 to 0.05 e.g. about 0.04 while for 75% metrizoate the optimal ratio $Ca^{++}/Na^+$ may be somewhat higher, for example 0.037 to 0.07 e.g. about 0.05.

The invention is of especial utility where high $Na^+$ concentrations are concerned and consequently injectable preparations having an $Na^+$ concentration of at least 8 mg. $Na^+$ per ml. are of particular interest; concentrations of over 16 mg. $Na^+$ per ml. or even above 24 mg. $Na^+$ per ml. are common in radiology and are particularly important. It is convenient to consider the quantity of magnesium or calcium ions in the preparation in terms of the ratio of such ions to sodium ions in normal plasma. The concentration of calcium, magnesium and sodium ions in normal plasma and the respective concentration ratios $M/Na^+$ are shown in Tables II and III below.

TABLE II

| Metal ions: | mg./100 ml. human plasma |
|---|---|
| $Na^+$ | 330 |
| $Ca^{++}$ | 5–6 |
| $Mg^{++}$ | 2–2.5 |

TABLE III

Ratio of metal ions in human plasma:
$Ca^{++}/Na^+ = Cap = 0.015–0.018$
$Mg^{++}/Na^+ = Mgp = 0.006–0.0076$ The ratio of magnesium ions to sodium ions in normal plasma ($Mg^{++}/Na^+ = Mgp$) is 0.006 to 0.0076 and if the ratio of magnesium ions to sodium ions in an injectable preparation ($Mg^{++}/Na^+ = Mgm$) is 0.012, that ratio can be said to be twice the normal plasma ratio (Mgm/Mgp=2). When the quantities of ions are expressed in this way, the preferred range for magnesium is Mgm/Mgp=1 to 6. The preferred range for calcium (Cam/Cap) also 1 to 6. The ratio Mgm/Mgp is referred to herein as Mgf and the ratio Cam/Cap is referred to as Caf.

The metal ions in the preparations must, of course, be in the completely free state and any calcium or magnesium bound in complexes, for example with chelating agents such as ethylene diamine tetracetic acid, should not be included in calculating the above metal ion ratio. Such chelating agents are commonly added to radiological preparations to complex any heavy metal ions which may have been introduced during manufacture and which might be harmful to the stability of the preparations.

The preparations may be produced in general by a process in which a sodium compound and a calcium and/or magnesium compound are mixed in solid or dissolved form with a liquid medium to form an aqueous solution of said sodium salt containing calcium and/or magnesium ions.

Thus, for example, the preparations may be prepared merely by addition of water-soluble physiologically acceptable calcium or magnesium salts, for example the chlorides in solid or dissolved form, to an aqueous solution of the active sodium salt. This method is convenient but it may be preferable to keep the total ionic concentration as low as possible. This can be achieved by adding the calcium or magnesium ions as salts of the same acid as the active sodium salt or by reacting the acid itself with appropriate quantities of other sodium, calcium and/or magnesium compounds such as MgO, $Mg(OH)_2$, CaO, $CaCO_3$ or $Ca(OH)_2$ as well as NaOH or $NA_2CO_3$ to give a neutral solution. Thus, for example, MgO and $Ca(OH)_2$ in aqueous suspension can be reacted with an excess of the appropriate acid followed by addition of NaOH to about pH 7.0. It has been found that it is possible in certain media, such as in 75% sodium metrizoate, in which optimal amounts of calcium and magnesium are not truly soluble, and in which it may be difficult or impossible to dissolve the required amounts of calcium and or magnesium by dissolution of the preformed calcium and/or magnesium metrizoates in the sodium metrizoate solution, to prepare supersaturated solutions. These can easily be prepared as generally described above and in more detail in the example (Procedures 1 and 2), the super saturated solutions being extremely stable in sealed ampoules after autoclaving, while crystal growth more easily takes place in non-autoclaved solutions and in autoclaved solutions after the seal of the ampoules has been broken.

In other cases, sufficient solubility or reduced supersaturation of the added calcium or magnesium salt can be obtained by using a mixture of the sodium salts of two or more iodinated acids.

The solutions may contain a chelating agent, as indicated above, disodium calcium ethylene diamine tetracetate being convenient. The quantity of calcium in this salt is ignored in calculating the calcium ion ratio. Small amounts e.g. 0.15 mg./ml., of sodium biphosphate added as a buffer, may also be compatible with calcium and magnesium ions in sealed and autoclaved solutions in media such as for example 80% sodium iothalamate.

In order that the invention may be well understood we give the following examples by way of illustration only:

EXAMPLE 1

Preparation of an X-ray contrast medium containing sodium metrizoate together with small amounts of calcium metrizoate and magnesium metrizoate, the total concentration of metrizoate corresponding to that of a 75% (w./v.) sodium metrizoate solution. Formulation for 100 ml. of solution:

Metrizoic acid—72.47 g.
10 N NaOH—10.6 ml.; 4.240 g. corresponding to 2439 mg. $Na^+$
Calcium oxide—0.1523 g., corresponding to 108.8 mg. $Ca^{++}$
Magnesium oxide—0.0787 g., corresponding to 47.2 $Mg^{++}$
Redistilled water to 100 ml.

(a) *Procedure 1.*—About one-third of the metrizoic acid is suspended in 45 ml. of water. The calcium oxide and magnesium oxide are added and stirred for 15 minutes and the solution is then neutralized by means of sodium hydroxide.

The remaining metrizoic acid is added in portions of about ⅓ at a time, and is neutralized on each addition by means of sodium hydroxide. The pH should preferentially be kept below 7.5 during addition. Disodium calcium EDTA (25 mg.) is added, the volume is adjusted to 100 ml. and the pH to 7.0–7.5.

The solution, containing 68.92% sodium metrizoate, 3.54% calcium metrizoate, and 2.54% magnesium metrizoate is filtered and autoclaved in the usual manner.

(b) *Procedure 2.*—In 100 ml. of 75% (w./v.) sodium metrizoate containing 25 mg. of disodium calcium EDTA (ethylene diamine tetraacetate) are dissolved 0.400 g. of $CaCl_2.2H_2O$ (108.8 mg. of $Ca^{++}$) and 0.394 g. of $MgCl_2.6H_2O$ (47.2 mg. of $Mg^{++}$).

The solution, having a similar composition with regard to metal ions as that described in (a) above is filtered and autoclaved in the usual manner.

EXAMPLE 2

N - methyl - 3,5 - diacetamido-2,4,6-triiodobenzoic acid (726 g.), calcium oxide (2.050 g.), magnesium oxide (1.075 g.) and disodium-calcium-EDTA (0.25 g.) were suspended in water (450 ml.) and heated to 45–50° C. The acid was slowly titrated in solution with 10 N sodium hydroxide solution; the pH never exceeded 7.5. When all acid was dissolved, the solution was treated with charcoal (5 g.) at pH 5.8 for 2 hours and then filtered. The volume was adjusted to 1 l. ($n_D^{20}$:1.4535) and the pH to 7.4 resulting in a 75% (w./v.) solution calculated as the sodium salt with Caf=Mgf=3.5.

The solution was put in ampoules and autoclaved at 120° C. for 20 minutes.

EXAMPLE 3

To a 75% (w./v.) solution of sodium N-methyl-3,5-diacetamido-2,4,6-triiodobenzoate 1 equivalent of magnesium chloride was added. After stirring for 3 hours the precipitated magnesium salt was filtered, washed with water and dried at 80% relative humidity yielding a hydrate containing 1.56% Mg. Corresponding to this procedure the calcium salt was prepared, yielding a hydrate containing 2.65% Ca.

N - methyl - 3,5 - diacetamido-2,4,6-triiodobenzoic acid (402.2 g.), the above described magnesium salt (17.0 g.) and calcium salt (22.8 g.) and $Na_2Ca$-EDTA (0.15 g.) were suspended in water (500 ml.) and titrated slowly in solution with 10 N sodium hydroxide solution at room temperature. When all acid was dissolved, the solution was treated with charcoal (5 g.) at pH 6.0 for 2 hours and then filtered.

The volume was adjusted to 1 l. ($n_D^{20}$:1.4050) and the pH to 7.4—resulting in a 45% (w./v.) solution calculated as the sodium salt with Caf=Mgf=2.3.

The solution was put in ampoules and autoclaved at 120° C. for 20 minutes.

EXAMPLE 4

3,5-diacetamido-2,4,6-triiodobenzoic acid (483 g.), calcium oxide (0.922 g.) and $Na_2Ca$-EDTA (0.15 g.) were treated as described in Example 2 yielding 1 l. of a 50% (w./v.) solution calculated as the sodium salt with Caf=2.2.

EXAMPLE 5

A 80% (w./v.) solution calculated as the sodium salt with Caf=Mgr=3.0 of 5-acetamido-2,4,6-triiodo-N-methylisophthalamic acid was prepared by dissolving the said acid (722 g.), magnesium hydroxide (1.470 g.), calcium hydroxide (2.509 g.), $Na_2Ca$-EDTA (0.13 g.) and sodium biphosphate (0.15 g.) according to Example 2.

EXAMPLE 6

Magnesium chloride hexahydrate (2.705 g.) was dissolved at 40–50° C. in a 75% (w./v.) solution (1000 ml.) of sodium N-methyl-3,5-diacetamido-2,4,6-triiodobenzoate containing $Na_2Ca$-EDTA (0.25 g.). When the pH had been adjusted to 7.4, the solution was put in ampoules and autoclaved, resulting in a medium with Mgf=1.5.

EXAMPLE 7

According to Example 6 a 50% (w./v.) solution was obtained of 3-acetamido - 2,4,6 - triiodobenzoic acid with Caf=Mgf=2.5 by dissolving $MgCl_2.6H_2O$ (3.254) and $CaCl_2.2H_2O$ (3.254 g.) in the corresponding sodium salt solution (1000 ml., 50% w./v.). The temperature was kept at about 20° C. and the content of $Na_2Ca$-EDTA was 0.15 g.

EXAMPLE 8

3 - acetamido-5-propionamido-2,4,6-triiodobenzoic acid (43.5 g.), calcium oxide (0.215 g.) and $Na_2Ca$-EDTA (0.015 g.) were suspended in water (50 ml.) at room temperature. The acid was slowly titrated in solution with 5 N sodium hydroxide solution. When all acid was dissolved, the solution was treated with charcoal (0.5 g.) at pH 5.8 for 2 hours and then filtered. The volume was adjusted to 100 ml. and the pH to 7.4 before the solution was put in ampoules and autoclaved, resulting in a 45% (w./v.) medium calculated as the sodium salt with Caf=6.0.

EXAMPLE 9

N - methyl - 3,5 - diacetamido-2,4,6-triiodobenzoic acid (43.5 g.), magnesium carbonate, basic, declared as 40.0% magnesium oxide (0.111 g.), calcium carbonate (0.151 g.) and $Na_2Ca$-EDTA (0.015 g.) were suspended in water (50 ml.) and the acid titrated in solution with 5 N sodium hydroxide solution. When all acid was dissolved, the solution was treated with charcoal (0.5 g.) at pH 5.9 for 2 hours and filtered. The volume was adjusted to 100 ml. ($n_D^{20}$:1.4050) and the pH to 7.4, resulting in a 45% (w./v.) solution calculated as the sodium salt with Caf=Mgr=2.3.

EXAMPLE 10

Magnesium chloride hexahydrate (0.154 g.) and calcium chloride dihydrate (0.154 g.) were dissolved in a 20% (w./v.) solution (50 ml.) of sodium iodomethane sulphonate resulting in a solution with Caf=Mgf=2.5.

We claim:
1. An X-ray contrast composition comprising an aqueous solution of at least one sodium salt of an iodinated organic acid as contrast agent and containing divalent ions selected from the group consisting of magnesium ions alone and a mixture of magnesium and calcium ions, said solution having a weight ratio of divalent ions to sodium ions of at least 0.00025, a weight ratio of calucium ions to sodium ions no greater than 0.1 and a weight ratio of magnesium ions to sodium ions no greater than 0.05.

2. A composition as claimed in claim 1 in which said iodinated organic acids are polyiodocarboxylic acids.

3. A composition as claimed in claim 1 in which the contrast agent is sodium 3,5-diacetamido-2,4,6-triiodobenzoate.

4. A composition as claimed in claim 1 in which the contrast agent is sodium 3-acetamido-5-methylcarbamyl-2,4,6-triiodobenzoate.

5. A composition as claimed in claim 1 in which the contrast agent is sodium 3,5-dipropionylamido-2,4,6-triiodobenzoate.

6. A composition as claimed in claim 1 in which the contrast agent is sodium N,N'-di(hydroxyethyl)-3,5-diacetylamido-2,4,6-triiodobenzoate.

7. A composition as claimed in claim 1 in which the contrast agent is sodium N-methyl-3,5-diacetamido-2,4,6-triiodobenzoate.

8. A composition as claimed in claim 1 which contains more than 8 mg. sodium ion per millilitre.

9. A composition as claimed in claim 8 which contains more than 16 mg. sodium ion per millilitre.

10. A composition as claimed in claim 8 which contains more than 24 mg. sodium ion per millilitre.

11. A composition as claimed in claim 1 in which said divalent ions to sodium ions ratio is at least 0.0005.

12. A composition as claimed in claim 1 in which the ratio of magnesium ions to sodium ions is 0.005 to 0.05.

13. A composition as claimed in claim 1 which contains a mixture of magnesium and calcium ions and the weight ratio of calcium ions to sodium ions is 0.015 to 0.10.

14. A composition as claimed in claim 1 in which the said divalent ions are provided by a physiologically and chemically compatible water soluble salt of said ions other than a salt of said iodinated acid.

15. A composition as claimed in claim 1 in which the said divalent ions are provided by a member selected from the group consisting of magnesium chloride and a mixture of magnesium and calcium chlorides.

16. A composition as claimed in claim 1 in which said divalent ions are furnished by at least one salt of the iodinated acid which is present in the form of its sodium salt.

17. A composition as claimed in claim 1 also containing a chelating agent as a stabilizing agent.

18. A composition as claimed in claim 1 in which said sodium salt is selected from the group consisting of sodium N-methyl-3,5-diacetamido-2,4,6-triiodobenzoate and sodium 3-acetamido-5-methylcarbamyl - 2,4,6 - triiodobenzoate at a concentration of 75% and 80% by weight respectively and said composition also contains a small amount of sodium biphosphate as a buffer.

19. A composition as claimed in claim 1 which contains a mixture of magnesium and calium ions and the calcium and magnesium ions are present in approximately their physiological ratio of 2.3:1.

References Cited

UNITED STATES PATENTS

| | | | |
|---|---|---|---|
| 2,921,884 | 1/1960 | Nachod et al. | 167—95 |
| 3,175,952 | 3/1965 | Bird | 167—95 |

ALBERT T. MEYERS, *Primary Examiner.*

SAM ROSEN, *Examiner.*

V. C. CLARKE, *Assistant Examiner.*